United States Patent
Song

(10) Patent No.: US 8,922,591 B2
(45) Date of Patent: Dec. 30, 2014

(54) HOLOGRAPHIC DISPLAY

(75) Inventor: Jim J. Song, Stockbridge, GA (US)

(73) Assignee: Innovare Solutions, LLC, San Diego, CA (US)

( * ) Notice: Subject to any disclaimer, the term of this patent is extended or adjusted under 35 U.S.C. 154(b) by 462 days.

(21) Appl. No.: 13/218,312

(22) Filed: Aug. 25, 2011

(65) Prior Publication Data

US 2013/0050184 A1   Feb. 28, 2013

(51) Int. Cl.
 *G09G 5/00*  (2006.01)
 *G02B 27/22* (2006.01)
 *H04N 13/04* (2006.01)

(52) U.S. Cl.
 CPC ........ *G02B 27/2285* (2013.01); *H04N 13/0488* (2013.01)
 USPC .......................................... 345/649; 345/419

(58) Field of Classification Search
 USPC .................................. 345/649, 419
 See application file for complete search history.

(56) References Cited

U.S. PATENT DOCUMENTS

| | | |
|---|---|---|
| 2001/0048405 A1 | 12/2001 | Salley |
| 2005/0035962 A1 | 2/2005 | Ishibashi et al. |
| 2005/0180007 A1 | 8/2005 | Cossairt et al. |
| 2008/0297593 A1 | 12/2008 | Debevec et al. |
| 2010/0201949 A1 | 8/2010 | Barnett et al. |

FOREIGN PATENT DOCUMENTS

| | | | | |
|---|---|---|---|---|
| JP | 2002032785 A | * | 1/2002 | .............. G06T 17/40 |
| KR | 2003-0080763 A | | 10/2003 | |

OTHER PUBLICATIONS

International Search Report dated Jul. 25, 2013 for PCT/US2013/033362.
International Search Report dated Jan. 21, 2013 for PCT/US2012/051931.

* cited by examiner

*Primary Examiner* — Maurice L McDowell, Jr.
(74) *Attorney, Agent, or Firm* — Mintz Levin Cohn Ferris Glovsky and Popeo, P.C.

(57) ABSTRACT

A system and method for generating a simulated three-dimensional object is disclosed. An initial image of a three-dimensional object is generated at an initial reference position on X, Y and Z axes. A number of displacement images of the object is generated at each of a number of angular offsets about one or more of the X, Y, or Z axes. Each of the displacement images are displayed on an electronic display in a sequence according to a direction around one or more of the X, Y, or Z axes. The electronic display is then rotated around the one or more of the X, Y, or Z axes at a speed synchronized to the spaced angles of displacement of the plurality of images.

9 Claims, 5 Drawing Sheets

HOLOGRAPHIC DISPLAY

BACKGROUND

This disclosure relates generally to display technology, and more particularly to generating a simulated three-dimensional or holographic object using a rotating display.

Modern computer technology allows for advanced rendering of complex, virtual environments at high frame rates. The use of this technology can be seen in some of today's movies, TV shows and video games. Vast amount of computer power, in combination with various polarized displays or synchronized shutter glasses, also enables creation of stereoscopic views for simulating three-dimensional displays. However, these techniques are still expensive and complex, and are difficult to implement.

SUMMARY

In general, this document discloses a simulated three-dimensional or holographic display system. The holographic display in accordance with implementations described herein provides a rich three-dimensional experience without the aid of additional peripherals. The holographic display can provide an immersive three-dimensional experience by utilizing the processing capabilities of graphics processing units (GPUs) and central processing units (CPUs) of conventional computing platforms, servers, desktop computers, laptops, smartphones, tablet computers, etc., and rotating displays synchronized to a computer-generated display.

The holographic display uses one or more flat panel displays that are rotated in synchronization with images produced by a computer. The resulting effect is an illusion of height, width and depth, in other words, three-dimensional structure. The display can be a liquid crystal display (LCD), light emitting diode (LED) display, organic LED (OLED) display, or active-matrix OLED (AMOLED) display, from any of a number of devices, such as mobile devices like phones, laptops, and digital cameras, as well as larger devices like computer screens, or large panel television displays. It will be appreciated that other types of displays and devices can be used.

In one aspect, a method for generating a simulated three-dimensional object is performed using one or more computer processors. The method includes generating a plurality of images of a three-dimensional object at spaced angles of displacement about an axis, displaying each of the plurality of images on an electronic display in sequence according a direction around the axis, and rotating the electronic display in an opposite direction around the axis at a speed synchronized to the spaced angles of displacement of the plurality of images.

In another aspect, a computer processor-implemented method for generating a simulated three-dimensional object includes generating an initial image of a three-dimensional object at an initial reference position on X, Y and Z axes, and generating a plurality of displacement images of the object at each of a number of angular offsets about one or more of the X, Y, or Z axes. The method further includes displaying each of the plurality of displacement images on an electronic display a sequence according to a direction around one or more of the X, Y, or Z axes, and rotating the electronic display around the one or more of the X, Y, or Z axes at a speed synchronized to the spaced angles of displacement of the plurality of images.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

DETAILED DESCRIPTION

This document describes a simulated three-dimensional or holographic display that uses one or more flat panel displays that are rotated in synchronization with an image produced by a computer. In other words, a computer-generated display, from a known reference position, is synchronized to a rotation offset of the physical display. The computer-generated display can be produced by any graphics library, such as DirectX, OpenGL or other graphics library. The graphics display is generated in synchronization with a rotation of the display device.

Figure 1:
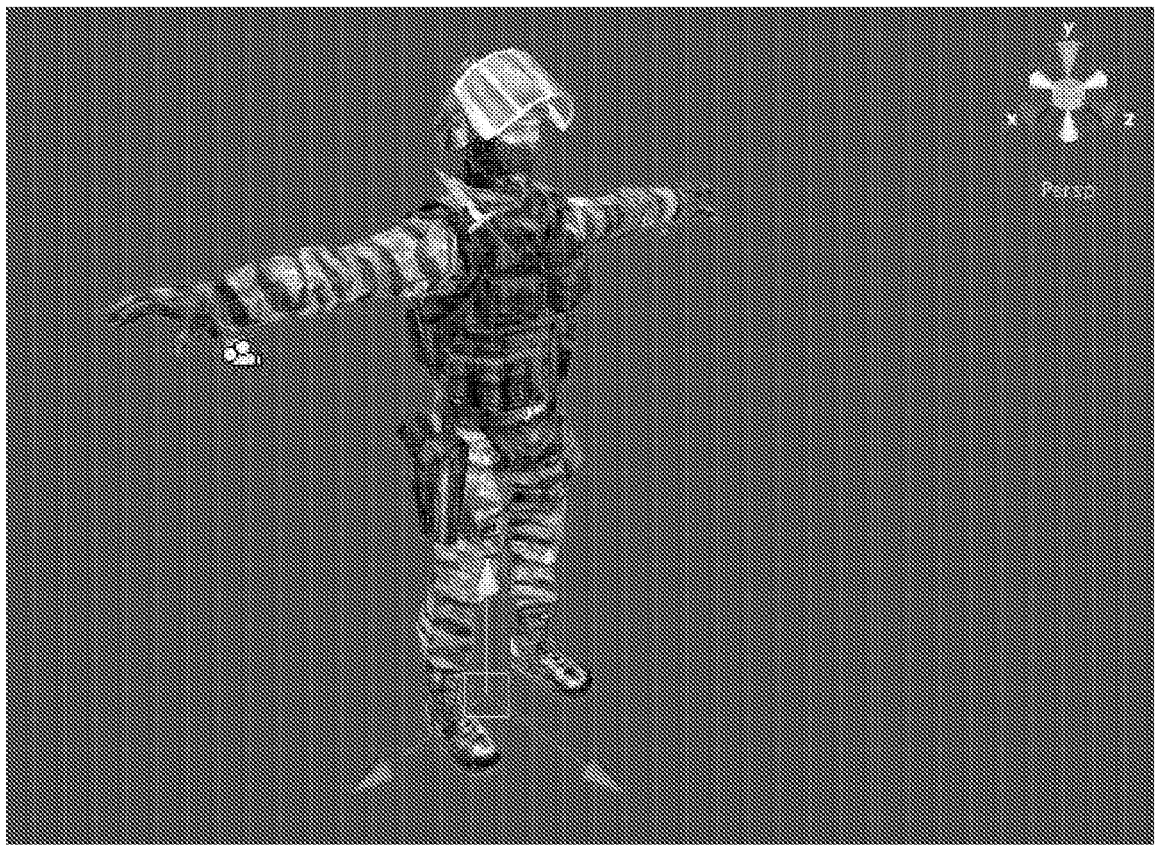
FIG. 1 illustrates a simulated three-dimensional or holographic display.

In reference to FIG. 1, an operation of the holographic display will now be described in terms of a computer-generated model (or "computer model"), a 2D image of a three-dimensional object. In this example, the computer model is of a soldier. However, those of relevant skill in the art will recognize that any computer model, or complex scene of models, can be used with the holographic display. The computer model is rendered and displayed on a physical electronic display, based on the X, Y and Z axes. The electronic display is described below in terms of a smart phone display device, which displays a computer model as if photographed at different angles of displacement by a virtual camera that moves around the modeled object at a fixed radial distance.

Figure 2:
FIG. 2 illustrates an image of a computer model at an initial orientation about the x, y and z axes.

FIG. 2 illustrates an image of the computer model as if taken by a virtual camera directly in front of the computer model, which is considered to be the reference point with zero degree of displacement, i.e. initially at an imaginary origin, (i.e. x=0, y=0 and z=0), although any initial orientation can be used. The computer model is then rendered around a scene at a fixed radial distance but at different angles of displacement. The image rendered to the physical display is determined by an angle of the rotation platform to a known reference point.

Figure 3:
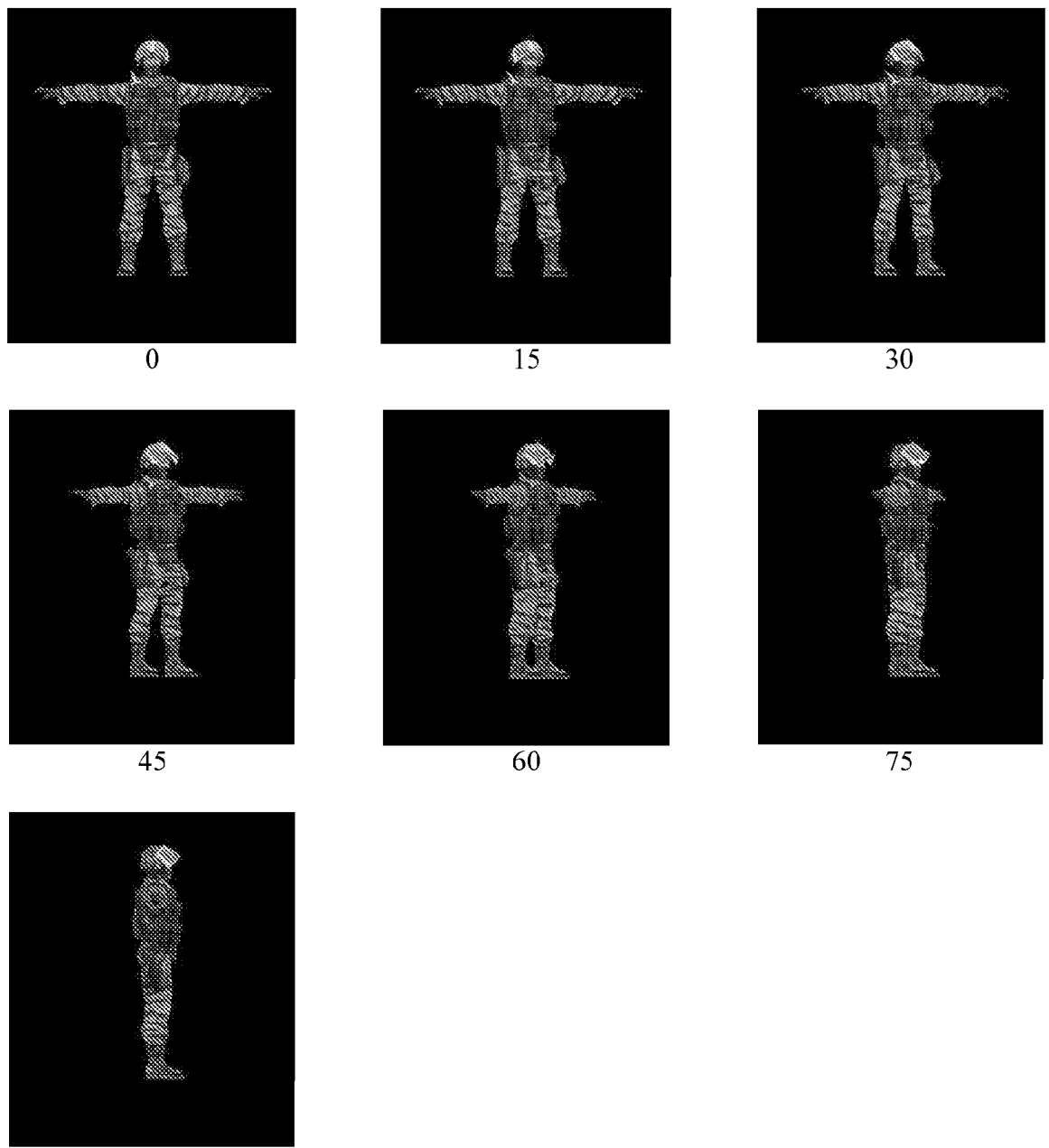
FIG. 3 illustrates a number of images of the computer model of FIG. 2 at incremental angular offsets from the initial orientation, about one of the x, y, or z axes.

FIG. 3 shows the computer model with an increasing displacement angle at increments of 15 degrees, in this case around the y-axis, but which could be any of the three axes or combination of axes. If the images below were refreshed on the display with a high enough speed and fidelity in angle of displacement between pictures, the model would appear to be rotating in the y-axis within the confines of a two-dimensional flat screen.

To produce the desired three-dimensional effects, if the display is rotated 15 degrees in a counterclockwise direction around the y-axis, the sequence of display of the various incremental views of computer model must be 15 degrees in the clockwise direction around the y-axis. If the electronic display of the computer model continually rotates at the same magnitude but in the opposite direction of the sequence of displayed images, it Will appear as though soldier is standing still: one could see all sides of the computer model by physically moving oneself to different angles relative to the display. By physically moving oneself from the front of the display to the back, a person would then see the back side of the soldier. The same would be true if person moved to the right or left.

If the angular velocity is increased to the point where the physical boundaries of the display (i.e. the out edges) are no longer clearly visible, the computer model will further take on the appearance of being a three-dimensional object, and the holographic display will give the illusion of a real object.

Just as sequential still frames displayed at high speeds will produce the illusion of motion, the physical rotation of a display, synchronized with an angular-displaced rendering of a computer-generated model displayed on a screen, will produce an illusion of a three-dimensional rendering with characteristics of height, width and depth.

Figure 4:
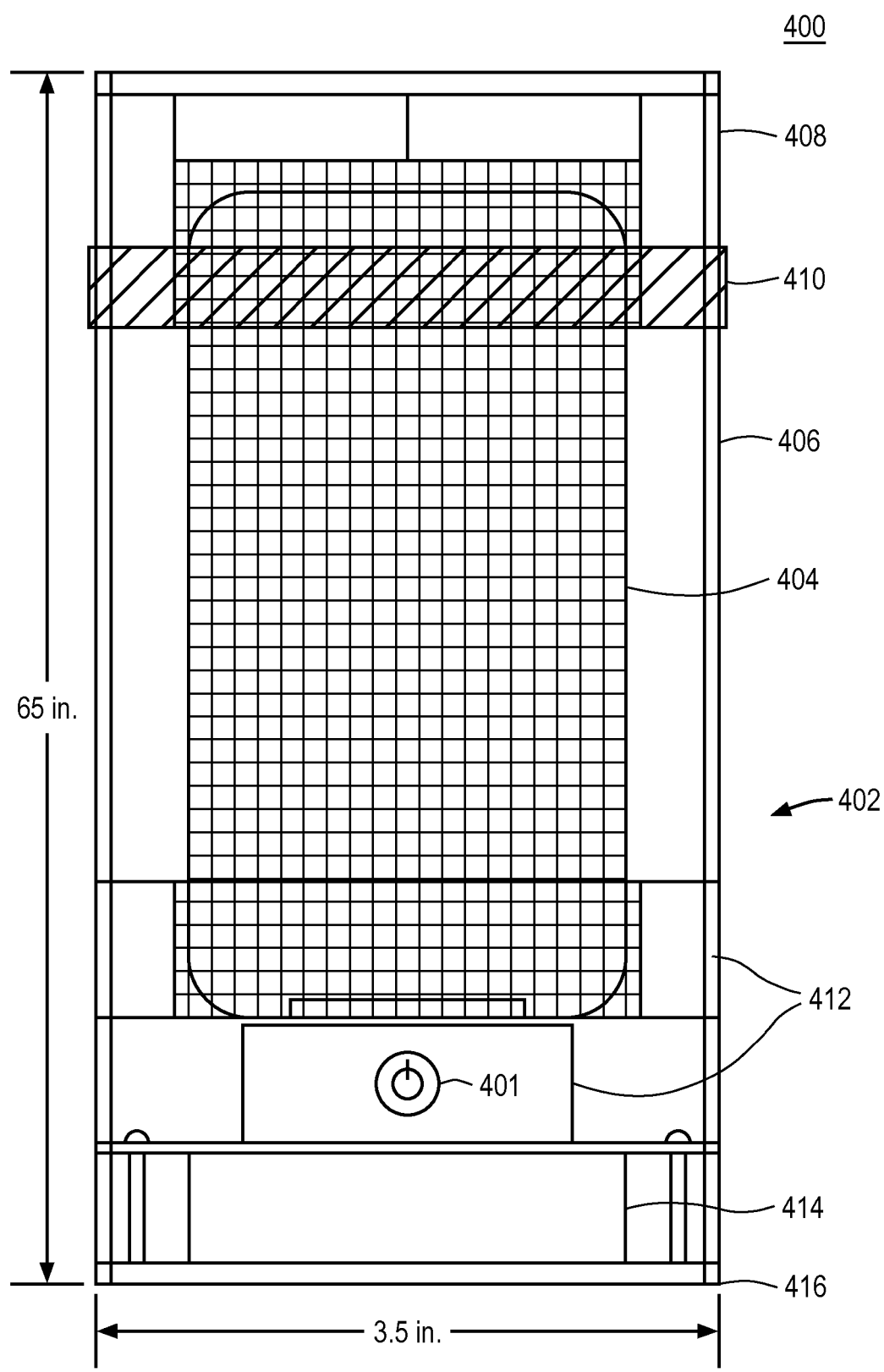
FIG. 4 is a mockup prototype of a physical unit that could house a three-dimensional display system

FIG. 4 illustrates an example of a holographic display system 400 that employs a display platform 402 to rotate at least one flat panel display 404 at a rate that is synchronized with a frame rate and angle of images generated of an object and displayed on the flat panel display 404. In preferred implementations, the display platform 402 includes a mounting mechanism 412 on which the flat panel display 404 is mounted, and a motor that rotates the mounting mechanism 412 at a controlled rate. In some implementations, the rate of rotation can be controlled to between 900 and 1,500 revolutions per minute (rpm). In other implementations, lower or higher speeds can be employed. For example, in one specific implementation, the rotation speed can be controlled to a rate between 120 and 7200 rpm.

In some preferred exemplary implementations, the flat panel display 404 is a touch screen-type display device as would be found on a conventional iPhone, iPod, or other smart phone or media player device. The display platform 402 can include a cylindrical sleeve 406 that is at least partially transparent, and preferably transparent all around the viewable area of the flat panel display 404. In some implementations, the sleeve 406 is transparent from all viewing angles, and the flat panel display 404 rotates inside of it, while in other implementations, the sleeve 406 rotates with the flat panel display 404.

The display platform 402 can further include a cap 408 that is coupled by threaded region 410 to the cylindrical sleeve 406. The cap 408 can be coupled by other coupling mechanism. The mounting mechanism 412 can include a dock with a data and electrical connection, as is found in conventional iPhone or iPod docking stations. The display platform 402 also includes a motor 414 attached to a non-moving base 416. The motor 414 rotates the mounting mechanism 412 to a rotation rate between 900 and 1,500 rpm. The motor 414 can be controlled by an external computer or other controller. In some implementations, the controller can include a control button 401 or switch for controlling one or more functions of the display platform 402.

Figure 5:
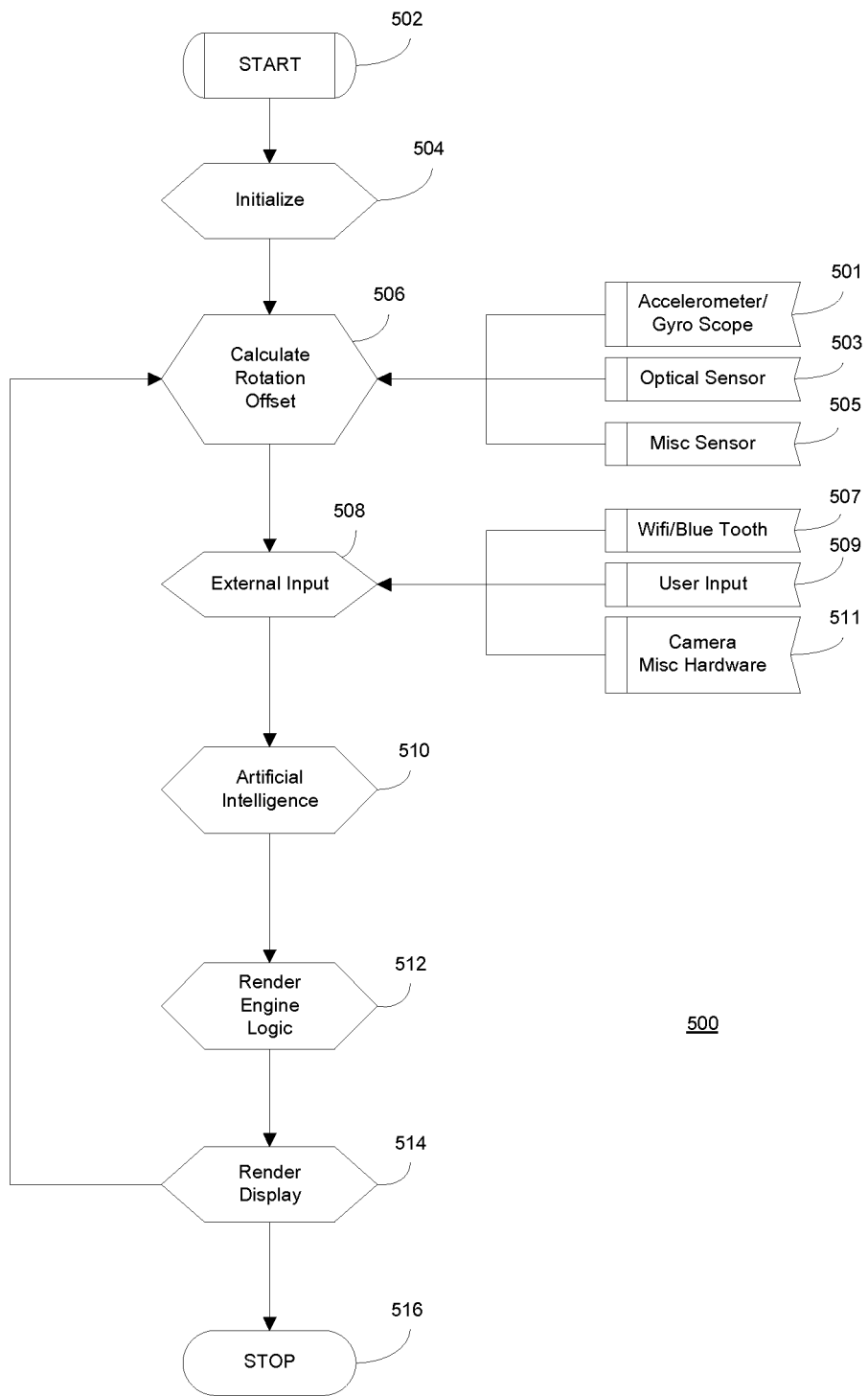
FIG. 5 is a flowchart of a method Like reference symbols in the various drawings indicate like elements.

FIG. 5 is a flowchart of a method 500 for generating a simulated three-dimensional or holographic display, starting at 502, by controlling a display platform to operate a flat panel display substantially as described above and as follows. At 504, the display is initialized, such as a rendering of an object from an initial angle or view. At 506, a rotation offset is calculated, based on inputs including an accelerometer or gyroscope 501, optical sensor 503 and/or other sensor 505. At 508, external input is received by the display platform, including WIFI or Bluetooth data input 507, user input 509 such as can provided by a computer or other input device, and/or camera or other miscellaneous hardware 511. At 510, artificial intelligence is performed on the display platform, such as speed of rotation, number of frames per second to be displayed, display angle of the object to be rendered, etc. At 512, the artificial intelligence is used to provide the engine logic to control the display platform. At 514, the display is rendered by rotating the display synchronized with a frame rate and image angle of an object being displayed. The method 500 can repeat at 506, or stop at 516.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A system comprising:
an electronic display that displays a plurality of displacement images of a three-dimensional object at each of a number of angular offsets about one or more of X, Y, or Z axes, the display being controlled to display each of the plurality of displacement images at a frame speed and a sequence according to a direction around one or more of the X, Y, or Z axes; and
a rotation mechanism that rotates the electronic display at a rotational rate that is synchronized to the frame speed and the sequence of the display of the plurality of displacement images.

2. The system in accordance with claim 1, wherein the plurality of displacement images includes an initial image of the three-dimensional object at an initial reference position on the X, Y, and Z axes.

3. The system in accordance with claim 1, wherein the rotation of the electronic display is in a direction opposite the direction of displaying each of the plurality of displacement images.

4. A method comprising:
displaying, by at least one processor, a plurality of displacement images of a three-dimensional object at each of a number of angular offsets about one or more of X, Y, or Z axes, the display being controlled to display each of the plurality of displacement images at a frame speed and a sequence according to a direction around one or more of the X, Y, or Z axes; and
rotating, by at least one processor, the display at a rotational rate that is synchronized to the frame speed and the sequence of the display of the plurality of displacement images.

5. The method in accordance with claim 4, wherein the plurality of displacement images includes an initial image of the three-dimensional object at an initial reference position on the X, Y, and Z axes.

6. The method in accordance with claim 4, wherein the rotating the display is in a direction opposite the direction of displaying each of the plurality of displacement images.

7. A non-transitory computer-readable medium containing instructions to configure a processor to perform operations comprising:
displaying, by the processor, a plurality of displacement images of a three-dimensional object at each of a number of angular offsets about one or more of X, Y, or Z axes, the display being controlled to display each of the plurality of displacement images at a frame speed and a sequence according to a direction around one or more of the X, Y, or Z axes; and
rotating, by the processor, the display at a rotational rate that is synchronized to the frame speed and the sequence of the display of the plurality of displacement images.

8. The non-transitory computer-readable medium in accordance with claim 7, wherein the plurality of displacement images includes an initial image of the three-dimensional object at an initial reference position on the X, Y, and Z axes.

9. The non-transitory computer-readable medium in accordance with claim 7, wherein the rotating the display is in a direction opposite the direction of displaying each of the plurality of displacement images.

* * * * *